UNITED STATES PATENT OFFICE.

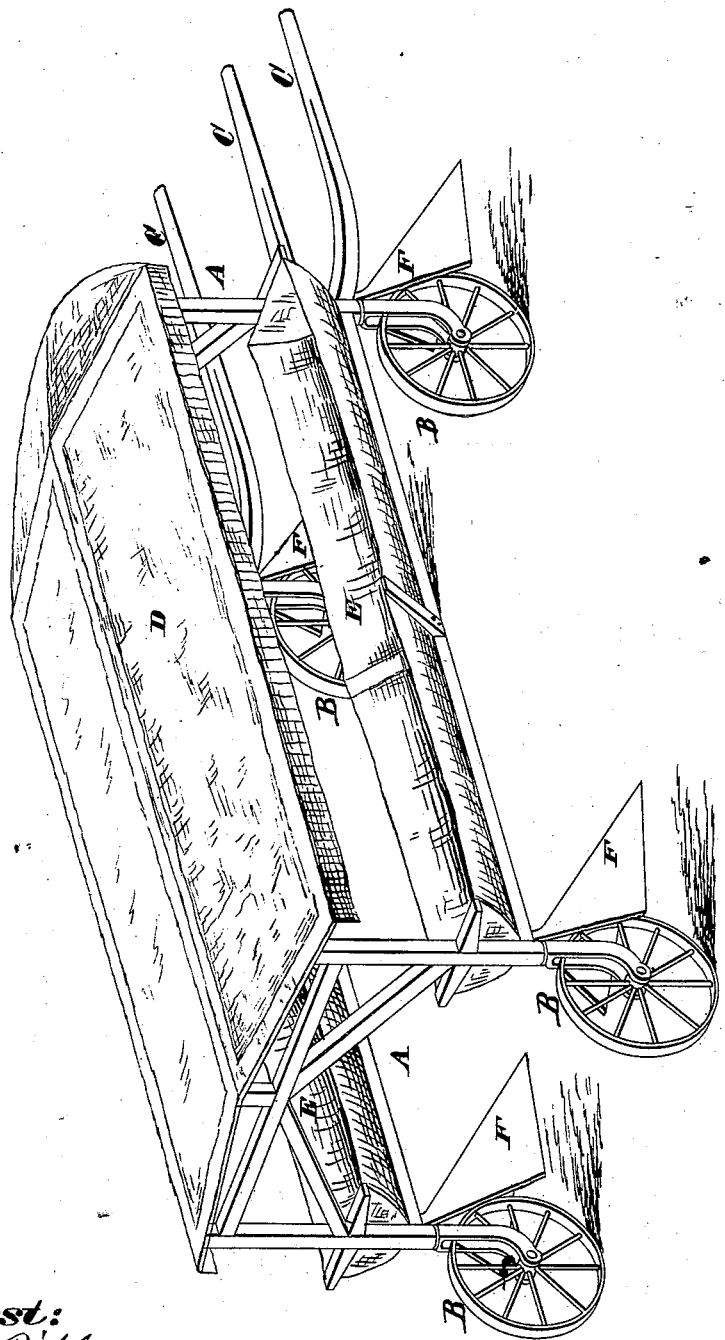

CHARLES P. COLLINS, OF SAN MARCOS, TEXAS.

COTTON-PICKER'S WAGON.

SPECIFICATION forming part of Letters Patent No. 253,980, dated February 21, 1882.

Application filed July 28, 1881. (No model.)

*To all whom it may concern:*

Be it known that I, CHARLES P. COLLINS, of San Marcos, in the county of Hays and State of Texas, have invented a certain new and useful Improvement in Cotton-Pickers' Wagons, of which the following is a full, clear, and exact description, reference being had to the accompanying drawing, forming part of this specification.

My improvement consists in a suitable framework supported on wheels and covered on top by canvas or other suitable material to protect the pickers from the rays of the sun or from the rain, and on one or both sides of the frame, preferably both, is a trough for receiving the picked cotton.

The drawing is a perspective view of my improved wagon.

A is the frame-work, which is supported on suitable wheels, B, and which is preferably provided with suitable shafts, C, for the attachment of the draft-animals. The top of the frame is covered with canvas or other suitable material, D, to protect the person or persons gathering the cotton from the rays of the sun, or from rain in wet weather.

On either or both sides of the frame is a trough, E, for receiving the cotton as it is picked.

The wagon straddles the row or rows of cotton being picked.

F F are separators, secured to the frame in front of the two front wheels of the wagon or in front of all four of the wheels, as shown, their purpose being to raise or move to one side stocks of cotton lying on the ground, and which otherwise would be run over and destroyed by the wheels.

I claim as my invention—

1. The combination of frame A, supported on wheels B, and having cover D, and trough or troughs E, substantially as set forth.

2. The cotton-picker's wagon consisting of frame A, wheels B, cover D, trough or troughs E, and shafts C.

3. The cotton-picker's wagon consisting of frame A, wheels B, cover D, trough or troughs E, and separator F, as set forth.

CHARLES P. COLLINS.

Witnesses:
STERLING FISHER,
JOHN E. PRITCHETT.